July 1, 1952   A. G. ROSE   2,601,752
POWER-DRIVEN APPARATUS
Filed July 29, 1948   2 SHEETS—SHEET 1
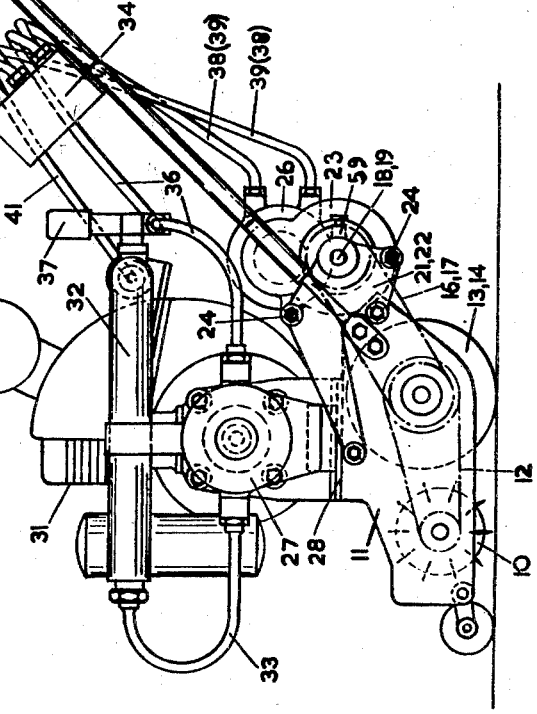
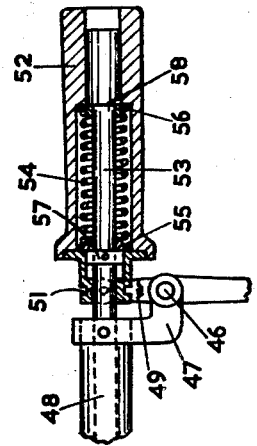
Inventor:
A.G. Rose.
by Munn, Liddy & Glascum
Attorneys

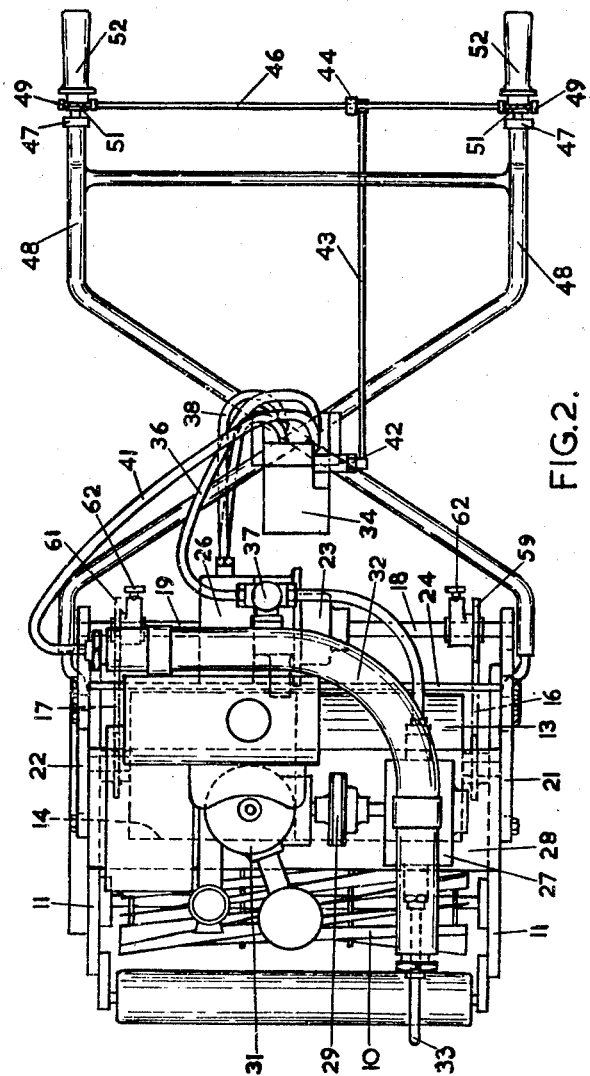

Patented July 1, 1952

2,601,752

UNITED STATES PATENT OFFICE 2,601,752

POWER-DRIVEN APPARATUS

Alfred German Rose, Gainsborough, England

Application July 29, 1948, Serial No. 41,292
In Great Britain August 8, 1947

3 Claims. (Cl. 56—26)

This invention relates to power-driven agricultural apparatus, or other apparatus of the kind adapted to be manipulated by an operator during perambulation. An object of the invention is to provide an improved driving and controlling means for such apparatus.

According to the invention, there is provided an apparatus of the above kind wherein rotation of the driving wheel or like driving member is effected by power-actuated means under the influence of a movable operating member adapted upon movement to operate means controlling the action of said power-actuated means and by such operation cause said driving wheel or like member to rotate in one direction or the other according to the direction of movement of said operating member.

The power-actuated means may be in the form of a hydraulic motor or motors arranged in driving connection with the driving wheel or wheels, or like driving member or members, and in such a case, the controlling means may be in the form of a hydraulic valve connecting the motor to a suitable source of hydraulic power, e. g., a pump, mounted on the apparatus and driven by a suitable prime mover, e. g., an internal combustion engine, also mounted on the apparatus. The movable operating member may be in the form of a hand grip slidably mounted on a handle portion of the apparatus for movement in forward and rearward directions relatively to the general direction of movement of the apparatus and suitably connected to the controlling valve, the latter being so constructed that its operation by movement of the hand grip in forward and rearward directions, respectively, causes the motor to rotate in directions corresponding to forward and rearward movement of the driving wheel or wheels or like member or members. The hand grip may be arranged for rotational movement in addition to sliding movement for the purpose of differential control of a pair of oil motors, e. g., through a differential valve disposed between the oil motors and the main valve receiving the main pressure and exhaust lines from the main valve, the differential valve being operated by the rotational movement of the hand grips.

In order to avoid any "creeping" of the apparatus when left unattended with the engine running there may be provided in connection with the hand grip a neutralising device adapted automatically to return the hand grip to its neutral position as soon as it is released by the operator.

In a conventional design of framework for the above kind of apparatus, there is generally provided a pair of hand grips and for convenience they may both be slidably mounted and connected together so that they move as one.

The invention has been found particularly useful in its application to ploughs, lawn mowers, and other agricultural machinery, and by way of example, the invention will now be described in greater detail with reference to the accompanying diagrammatic drawings, as applied to a lawn mower.

In the drawings:

Figure 1 is an elevation of a lawn mower constructed in accordance with the invention, Figure 2 is a plan view of the apparatus shown in Figure 1, and Figure 3 is a detail of the apparatus shown in Figures 1 and 2, drawn to a somewhat larger scale.

Referring to the drawings, the general construction of the lawn mower is of conventional type wherein the cutting cylinder 10 is mounted in a main framework 11, and driven by chain gearing 12 from one of a pair of juxtaposed driving rollers 13 and 14 by which the mower is propelled along the ground.

The driving rollers 13 and 14 are connected, respectively, by chains 16 and 17 to a pair of differential shafts 18 and 19 rotatably mounted in frames 21 and 22, extending from the main framework 11, and in a differential housing 23 itself supported on stays 24 extending between the frames 21 and 22. Incorporated in the housing 23 is an oil motor 26 of known type comprising a stationary outer member and a rotatable inner member eccentrically mounted with respect to the axis of the outer member and provided with radially slidably vanes, the outer member being formed with pressure and exhaust ports for the passage of the driving oil. The rotatable inner member of the oil motor 26 is connected by gearing to a differential gear of conventional type controlling the shafts 18 and 19 differentially.

The oil motor is fed by a pump 27 mounted on a bedplate 28 secured to the main framework 11 and connected by a coupling 29 to an internal combustion engine, generally indicated by reference numeral 31, secured to the bedplate 28. Oil is drawn from a sump 32 by the pump 27 through a suction line 33 and fed to a controlling valve 34 through a main pressure line 36 in which is incorporated a relief valve 37 leading back to the sump. From the valve 34 the oil passes through a pressure line 38 to the pressure side of the motor 26 and returns from the exhaust side of the motor to the valve 34 through a return line 39, the oil finally returning to the sump 32 through a main return line 41. The pressure and return lines 38 and 39 are interchangeable under the control of the valve 34 for forward and reverse directions.

The valve 34 in this example is the subject of United States Patent No. 2,455,315, and details of its construction and operation need not, therefore, be described herein, reference being made to that patent specification for further details. The valve 34 is provided with an actuating arm 42 which is connected by a link 43 to an arm 44 depending from a rod 46 pivotally mounted in a pair of bearing members 47 attached to a handle portion 48 of the apparatus. Secured to the rod 46 are a pair of forked arms 49 bearing in grooves 51 formed in a pair of operating members 52.

Referring particularly to Figure 3, the operating members 52 are each in the form of a hand grip slidably mounted on a bearing shaft 53 extending from the handle portion 48. Arranged in a recess in the hand grip 52 is a spring 54 provided at its ends with flanges 55 and 56, respectively, slidably mounted on the shaft 53 between a collar 57 secured to the shaft 53 and a shoulder 58 on the shaft 53. The arrangement of the valve ports is such that forward movement of the hand grips 52 operates the valve to bring about rotation of the motor 26 in a direction corresponding to the forward movement of the driving rollers 13 and 14, while rearward movement of the hand grips 52 causes reverse motion.

The valve 34 is of a very sensitive nature, being so constructed that operation of the motor 26 is substantially instantaneous upon operation of the actuating arm 42 by the sliding movement of the hand grips 52, and it will thus be seen that substantially immediately upon movement of the hand grips in a forward direction the mower starts to move forwardly, and that when the hand grips are held stationary relatively to earth, e. g., by the operator coming to rest, the mower comes to rest substantially immediately, a slight hunting action taking place in the valve 34 by virtue of the slight movement necessary to operate the valve.

The spring 54, together with the flanges 55 and 56, the collar 57 and the shoulder 58 constitute a neutralising device for avoiding "creeping" of the mower when left unattended with the engine running, the spring automatically returning the hand grips 52 to the neutral position indicated in Figure 3 immediately upon release by the operator.

It will thus be seen that the mower is operated in a very simple and efficient manner with little or no exertion on the part of the operator, it being only necessary for the operator to push the hand grips 52 in the direction of movement required, the mower automatically following at a speed determined by the rate of movement of the operator.

In order to facilitate the movement of the mower along the ground when the engine is not running, the sprockets 59 and 61 driving the chains 16 and 17, respectively, are freely mounted on the shafts 18 and 19, respectively, and provided with spring-loaded driving pins 62 which can be released by hand at will.

I claim:

1. Power driven apparatus of the kind adapted to be manipulated by an operator during perambulation, comprising a hydraulic motor for propelling the apparatus, a single controlling member including at least one hand grip slidably mounted on a handle portion of the apparatus for movement in forward and rearward directions relatively to the general direction of movement of the apparatus, a hydraulic system for operating said motor, said system including a hydraulic valve and a pump, said valve being responsive to the forward and rearward sliding movement of said hand grip for controlling the action of the motor, thereby causing the apparatus to move correspondingly in a forward and rearward direction, and a neutralizing device adapted automatically to return the hand grip to a neutral position upon release of the hand grip by the operator, said neutralizing device comprising an axial recess in the handle portion having a shoulder at each end, a pair of fixed stops on the handle portion adjacent the shoulders of the recess, a compression spring the end faces of which are arranged to bear against the shoulders of the recess and the fixed stops when the hand grip is in its neutral position so that, upon movement of the hand grip on the handle portion in either direction, the spring is compressed between the shoulder at one end of the recess and the fixed stop adjacent the other end of the recess whereby the spring is enabled to return the hand grip to its neutral position upon release by the operator.

2. Power driven apparatus of the kind adapted to be manipulated by an operator during perambulation, comprising a hydraulic motor for propelling the apparatus, a hydraulic pump connected with said motor by conduit means for supplying fluid under pressure to the motor, an internal combustion engine for driving the pump, said pump and motor being mounted on the apparatus, a single controlling member including at least one hand grip slidably mounted on a handle portion of the apparatus for movement in forward and rearward directions relatively to the general direction of movement of the apparatus, a hydraulic valve in said conduit means responsive to the forward and rearward sliding movement of said hand grip for controlling the action of the motor, thereby causing the apparatus to move correspondingly in a forward and rearward direction, and a neutralizing device adapted automatically to return the hand grip to a neutral position upon release of the hand grip by the operator, said neutralizing device comprising an axial recess in the handle portion having a shoulder at each end, a pair of fixed stops on the handle portion adjacent the shoulders of the recess, a compression spring the end faces of which are arranged to bear against the shoulders of the recess and the fixed stops when the hand grip is in its neutral position so that, upon movement of the hand grip on the handle portion in either direction, the spring is compressed between the shoulder at one end of the recess and the fixed stop adjacent the other end of the recess whereby the spring is enabled to return the hand grip to its neutral position upon release by the operator.

3. In a power driven lawn mower of the kind comprising a main framework and a cutting cylinder mounted in the framework and driven by a rotatable driving member arranged to propel the mower along the ground, a driving and controlling mechanism comprising a hydraulic motor mounted on the framework and adapted to cause rotation of said driving member, a pump mounted on said framework and connected with said motor by conduit means for supplying hydraulic fluid to said motor, an internal combustion engine mounted on the framework and arranged in driving engagement with the pump, a single controlling member including at least one hand grip slidably mounted on a handle portion of the framework for movement in forward and rearward directions relatively in the general direction of movement of the mower, a hydraulic valve in said conduit means responsive to the forward and rearward sliding movement of said hand grip for controlling the action of the motor, thereby causing the mower to move correspondingly in a forward and rearward direction, and a neutralizing device adapted automatically to return the hand grip to a neutral position upon release of the hand grip by the operator, said neutralizing device comprising an axial recess in the handle portion having a shoulder at each end, a pair of fixed stops on the handle portion adjacent the shoulders of the recess, a compression spring the end faces of which are arranged to bear against the shoulders of the recess and the fixed stops when the hand grip is in its neutral position so that, upon movement of the hand grip on the handle portion in either direction, the spring is compressed between the shoulder at one end of the recess and the fixed stop adjacent the other end of the recess whereby the spring is enabled to return the hand grip to its neutral position upon release by the operator.

ALFRED GERMAN ROSE.

REFERENCES CITED

The following references are of record in the file of this patent:

UNITED STATES PATENTS

| Number    | Name        | Date           |
|-----------|-------------|----------------|
| 1,138,667 | Kitchen     | May 11, 1915   |
| 1,156,520 | Beeler      | Oct. 12, 1915  |
| 1,426,902 | Noel et al. | Aug. 22, 1922  |
| 2,055,724 | Irgens      | Sept. 29, 1936 |
| 2,367,466 | Loy         | Jan. 16, 1945  |
| 2,417,613 | Radabaugh   | Mar. 18, 1947  |